(12) United States Patent
Hisatsugu et al.

(10) Patent No.: US 11,394,952 B2
(45) Date of Patent: Jul. 19, 2022

(54) IMAGING DEVICE AND VEHICULAR DISPLAY DEVICE

(71) Applicant: DENSO CORPORATION, Kariya (JP)

(72) Inventors: Shinsuke Hisatsugu, Kariya (JP); Yoshio Oofuka, Kariya (JP); Mitsutoshi Nagata, Kariya (JP); Masahide Ogasawara, Kariya (JP)

(73) Assignee: DENSO CORPORATION, Kariya (JP)

( * ) Notice: Subject to any disclaimer, the term of this patent is extended or adjusted under 35 U.S.C. 154(b) by 71 days.

(21) Appl. No.: 16/741,850

(22) Filed: Jan. 14, 2020

(65) Prior Publication Data
US 2020/0154097 A1    May 14, 2020

Related U.S. Application Data

(63) Continuation of application No. PCT/JP2018/024098, filed on Jun. 26, 2018.

(30) Foreign Application Priority Data

Jul. 21, 2017 (JP) .............................. JP2017-142205

(51) Int. Cl.
*H04N 13/282* (2018.01)
*B60K 37/04* (2006.01)
(Continued)

(52) U.S. Cl.
CPC .......... *H04N 13/282* (2018.05); *B60K 37/04* (2013.01); *B60R 11/04* (2013.01); *H04N 5/247* (2013.01);
(Continued)

(58) Field of Classification Search
CPC ...... H04N 13/282; H04N 5/247; H04N 7/183; H04N 5/2254; H04N 5/33; H04N 5/2256; H04N 7/18; B60K 37/04; B60K 2370/741; B60K 2370/193; B60K 2370/52; B60K 2370/149; B60K 2370/21; B60K 37/06; B60K 35/00; B60R 11/04;
(Continued)

(56) References Cited

U.S. PATENT DOCUMENTS 6,927,674 B2 *  8/2005  Harter, Jr. .............. B60K 37/02
                                                    340/425.5
7,710,451 B2 *  5/2010  Gluckman ........... H04N 13/218
                                                       348/46
(Continued)

FOREIGN PATENT DOCUMENTS

JP      H0772384 A   *  3/1995
JP      2005323180 A *  11/2005
(Continued)

*Primary Examiner* — Jeff A Burke
*Assistant Examiner* — Sihar A Karwan
(74) *Attorney, Agent, or Firm* — Harness, Dickey & Pierce, P.L.C.

(57) ABSTRACT

An imaging device is provided in a vehicular display device mounted in a vehicle to display information and photographs a passenger of the vehicle. The imaging device includes an imaging unit having a plurality of viewpoint positions provided at vertically different locations in the vehicular display device. The imaging unit is configured to photograph the passenger from a plurality of viewpoints at the plurality of viewpoint positions.

9 Claims, 11 Drawing Sheets

(51) Int. Cl.
*B60R 11/04* (2006.01)
*H04N 5/247* (2006.01)

(52) U.S. Cl.
CPC .... *B60K 2370/193* (2019.05); *B60K 2370/52* (2019.05); *B60K 2370/741* (2019.05)

(58) Field of Classification Search
CPC ....... B60R 2011/0005; B60W 2420/40; G02B 17/08; G03B 15/00; G03B 15/02; G03B 37/00
USPC .......................................................... 348/38
See application file for complete search history.

(56) References Cited

U.S. PATENT DOCUMENTS

| | | | |
|---|---|---|---|
| 9,563,953 B2 * | 2/2017 | Xu | G06T 7/33 |
| 9,684,965 B1 * | 6/2017 | Takakura | G06T 7/593 |
| 2008/0068462 A1 | 3/2008 | Koumura | |

FOREIGN PATENT DOCUMENTS

| | | | |
|---|---|---|---|
| JP | 2010105461 A * | 5/2010 | |
| JP | 5122782 B2 | 1/2013 | |
| WO | WO-2019/017157 A1 | 1/2019 | |

* cited by examiner

IMAGING DEVICE AND VEHICULAR DISPLAY DEVICE

CROSS REFERENCE TO RELATED APPLICATIONS

The present application is a continuation application of International Patent Application No. PCT/JP2018/024098 filed on Jun. 26, 2018, which designated the U.S. and claims the benefit of priority from Japanese Patent Application No. 2017-142205 filed on Jul. 21, 2017. The entire disclosures of all of the above applications are incorporated herein by reference.

TECHNICAL FIELD

The present disclosure relates to an imaging device and a vehicular display device.

BACKGROUND

An imaging device has been known which is provided in a vehicular display device mounted in a vehicle to display information and photographs a passenger of the vehicle.

SUMMARY

The present disclosure describes an imaging device that is provided in a vehicular display device mounted in a vehicle to display information and photographs a passenger of the vehicle. The imaging device includes an imaging unit having a plurality of viewpoint positions provided at vertically different locations in the vehicular display device. The imaging unit is configured to photograph the passenger from a plurality of viewpoints at the plurality of viewpoint positions.

BRIEF DESCRIPTION OF DRAWINGS

Objects, features and advantages of the present disclosure will become more apparent from the following detailed description made with reference to the accompanying drawings, in which.

DETAILED DESCRIPTION

Figure 1:
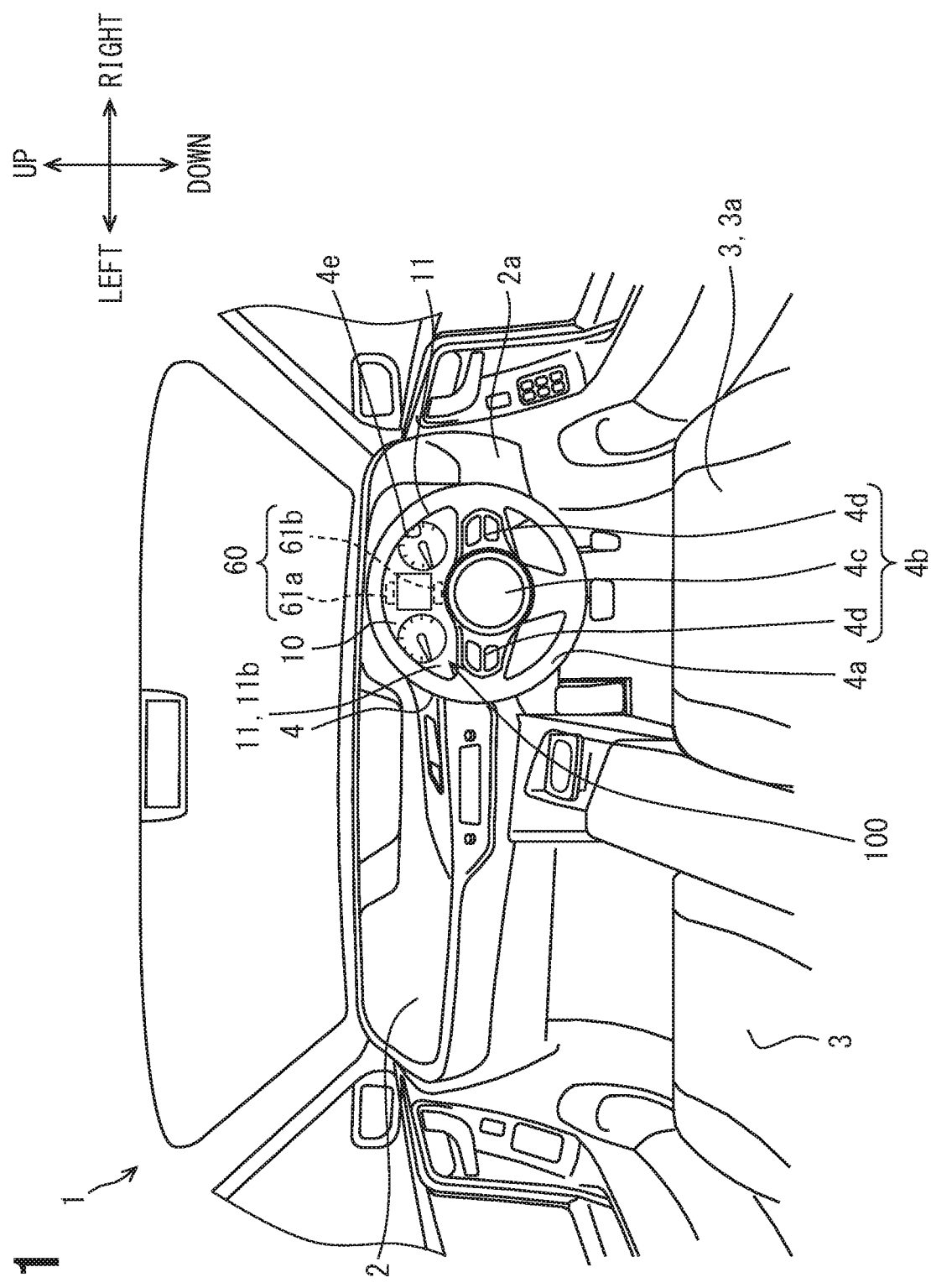
FIG. 1 is a view showing a layout of a vehicular display device in a vehicle, the vehicular display device including an imaging device, according to a first embodiment.

For example, an imaging device for a vehicular display device may be configured to photograph a passenger from a single viewpoint at one viewpoint position. In vehicles, however, passengers individually differ from each other in body frame or driving posture. Accordingly, there may be a concern that a single-viewpoint imaging unit cannot perform intended imaging due to a region (e.g., face) of a passenger to be imaged being located outside an imaging range.

In addition, in the vehicle, an obstacle which interrupts imaging, such as a steering wheel, may be disposed between a vehicular display device and a passenger. In such a case, there may be a concern that the single-viewpoint imaging unit cannot perform intended imaging due to the region of the passenger to be imaged being hidden by the obstacle.

Thus, there may be a room for improvement of robustness in terms of individually different body frames, individually different driving postures, or a positional relationship with an obstacle.

The present disclosure provides an imaging device and a vehicular display device which provide high robustness in imaging.

According to an aspect of the present disclosure, an imaging device is provided in a vehicular display device mounted in a vehicle to display information and is configured to photograph a passenger of the vehicle. The imaging device may include an imaging unit having a plurality of viewpoint positions. The plurality of viewpoint positions may be provided at vertically different locations in the vehicular display device, and the imaging unit may be configured to photograph the passenger from a plurality of viewpoints at the plurality of viewpoint positions.

In the imaging device with such a configuration, a passenger may be photographed from the multiple viewpoints at the plurality of viewpoint positions. Since the plurality of viewpoint positions are vertically displaced from each other, an overall photographing range can be vertically extended compared to that when the passenger is photographed from a single viewpoint. Accordingly, even when a position of a region (e.g., face) of the passenger to be photographed is vertically displaced from a standard position due to individually different body frames or individual different driving postures, it may be possible to photograph the region.

In a case where an obstacle which interrupts photographing, such as a steering operation portion, is disposed between the vehicular display device and the passenger, even if the region viewed from one of the viewpoint positions is hidden by the obstacle, it may be possible to photograph the region from another of the viewpoint positions vertically displaced from the one viewpoint position. Therefore, it may be possible to achieve high robustness in imaging.

According to another aspect of the present disclosure, a vehicular display device is mounted in a vehicle to display information and includes an imaging device that photographs a passenger of the vehicle. The imaging device may include an imaging unit having a plurality of viewpoint positions. The plurality of viewpoint positions may be provided at vertically different locations in the vehicular display device. The imaging unit may be configured to photograph the passenger from multiple viewpoints at the plurality of viewpoint positions.

In the vehicular display device with such a configuration, a passenger may be photographed from the multiple viewpoints at the plurality of viewpoint positions. Since the plurality of viewpoint positions are vertically displaced from each other, an overall photographing range can be vertically extended compared to that when the passenger is photographed from a single viewpoint. Accordingly, even when a position of a region (e.g., face) of the passenger to be photographed is vertically displaced from a standard position due to individually different body frames or individual different driving postures, it is possible to photograph the region.

In addition, when an obstacle which interrupts photographing, such as a steering operation portion, is disposed between the vehicular display device and the passenger, even if the region viewed from one of the viewpoint positions is hidden by the obstacle, it may be possible to photograph the region from another of the viewpoint positions vertically displaced from the one viewpoint position. Therefore, it may be possible to achieve high robustness in imaging.

A plurality of embodiments will be described below based on the drawings. Note that, by designating the components corresponding to each other in the individual embodiments by the same reference numerals, a repeated description thereof may be omitted. When only a part of a configuration is described in each of the embodiments, to the other part of the configuration, the configuration of the other previously described embodiment is applicable. Not only the configurations clearly shown in the description of the embodiments can be combined, but also the configurations of the plurality of embodiments, which are not clearly shown, can partially be combined unless the resulting combination presents a particular problem.

First Embodiment

As shown in FIG. 1, an imaging device 60 according to a first embodiment of the present disclosure is mounted in a vehicle 1 to photograph a passenger of the vehicle 1. The imaging device 60 of the present embodiment is used for a driver status monitor (DSM) which photographs a face of the passenger of the vehicle 1, particularly a driver, as an object to be photographed and processes an image thereof to monitor a status, such as a sleeping status or a distracted status, of the driver.

The imaging device 60 of the present embodiment is provided in a vehicular display device 100. The imaging device 60 is disposed, together with the vehicular display device 100, in an instrument panel 2 facing a seat 3 to be occupied by the passenger in a front-rear direction. More specifically, the imaging device 60 is disposed, together with the vehicular display device 100, in a driver seat facing portion 2a of the instrument panel 2 facing a driver seat 3a to be occupied by the driver in the front-rear direction.

In the present embodiment, wordings related to directions such as front-rear, vertical, and lateral directions are defined based on the vehicle 1 on a horizontal plane. Right and left are defined based on the passenger occupying the seat 3 facing forward.

In the vehicle 1, between the driver seat facing portion 2a and a head rest of the driver seat, a steering operation portion 4 of the vehicle 1 is disposed. The steering operation portion 4 forms an operation portion to be operated by the driver in a steering system which steers the vehicle 1. The steering operation portion 4 has an annular rim portion 4a, and a connecting portion 4b connecting the rim portion 4a to a steering shaft. The connecting portion 4b has a center pad portion 4c disposed over an axis of the steering shaft, spoke portions 4d radially extending to connect the center pad portion 4c and the rim portion 4a, and the like.

In the steering operation portion 4, an opening portion 4e surrounded by the rim portion 4a and the connecting portion 4b is formed. The opening portion 4e is located at an upper portion of the steering operation portion 4 when the steering operation portion 4 is at a normal position (i.e., position at which the steering operation portion 4 is at a steering angle which allows the vehicle 1 to drive straight ahead) and is formed in a semi-circular shape (or a sectoral shape) having an arcuate upper part. The opening portion 4e has a vertical maximum dimension smaller than a lateral maximum dimension thereof.

A position of the steering operation portion 4 relative to the instrument panel 2 including the vehicular display device 100 is adjustable. For example, the position of the steering operation portion 4 can be moved in a predetermined vertical range from a standard position SP.

Figure 2:
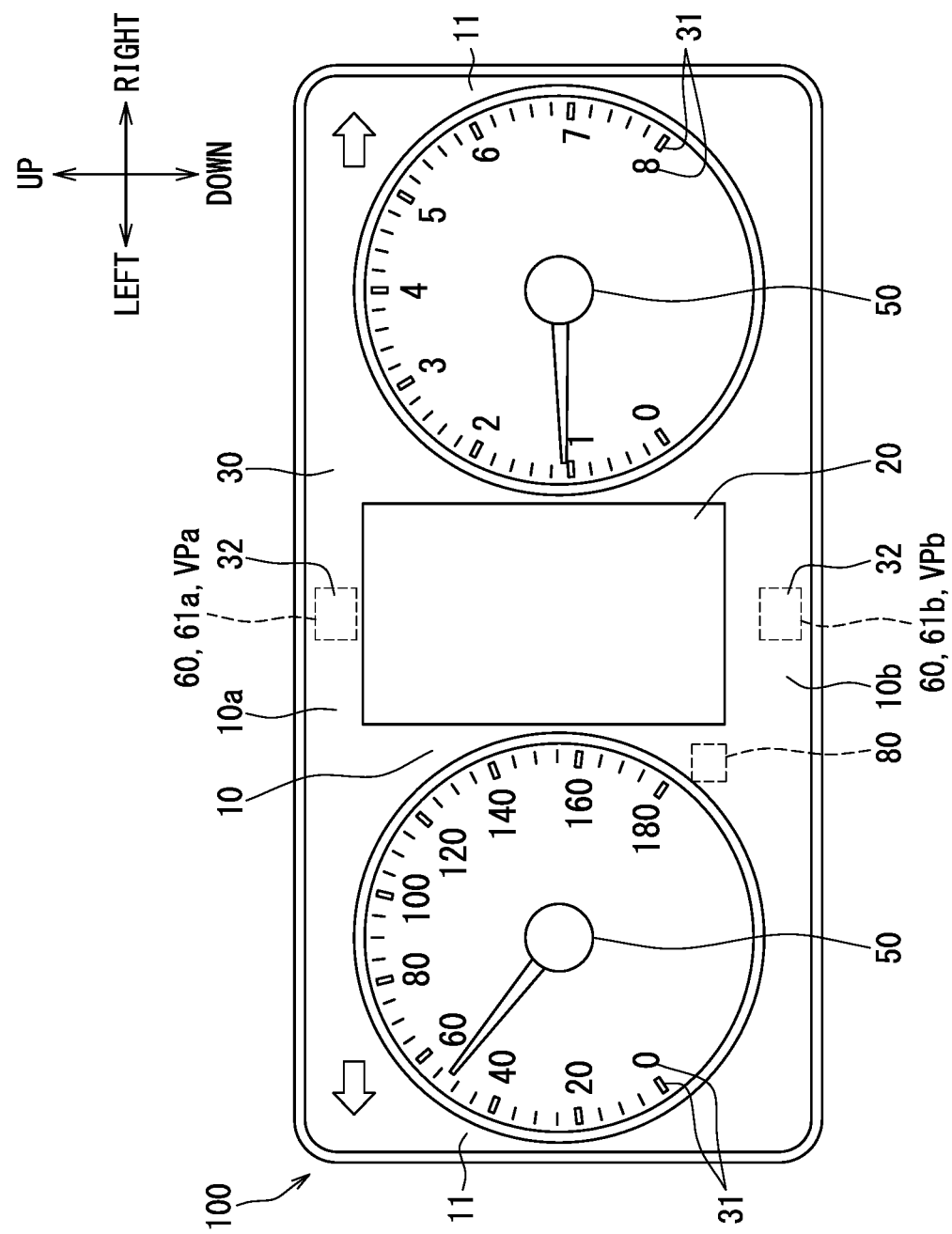
FIG. 2 is a front view of the vehicular display device of the first embodiment.

The vehicular display device 100 shown in FIG. 2 forms a combination meter formed of a combination of analog display including indicators 50 indicating index marks 31 and digital display including an image displayed by an image display element 20. The vehicular display device 100 displays information to a passenger on a visual-recognition side. Examples of the displayed information include a speed of the vehicle 1, the number of engine revolutions, a remaining fuel amount, a temperature of engine cooling water, a current value of an electric motor, and a state of the vehicle 1 such as an abnormality in the vehicle 1. Other examples of the displayed information include various information items such as an alarm, road information, field-of-view assisting information, and an e-mail. Since the vehicular display device 100 is disposed on a side (hereinafter referred to as the counter-visual-recognition side) opposite to the visual-recognition side relative to the steering operation portion 4, the information thus displayed is mainly visually recognized from a center of standard eye points CSE (see also FIG. 6) through the opening portion 4e of the steering operation portion 4.

The center of standard eye points CSE mentioned herein is a virtual point set for each vehicle to represent a left eye position and a right eye position of a driver in a normal driving status. The center of standard eye points CSE is generally set at a height of 635 mm immediately above a seating reference point. The seating reference point refers to a position of a H-point in a human body model (hip joint point in the model) when the human body model is placed to occupy a seat such as the driver seat in accordance with a seating method defined in ISO 6549-1980 or to a design standard position set over a seat corresponding thereto.

The vehicular display device 100 described above is formed to have a center portion 10 and a pair of lateral portions 11 located on left and right sides of the center portion 10 and consequently have a wide shape in which a lateral dimension is larger than a vertical dimension. The vehicular display device 100 includes the image display element 20, a display plate 30, display light source portions 40, the indicators 50, the imaging device 60, and the like.

The image display element 20 is disposed in the center portion 10 of the vehicular display device 100. In the present embodiment, the image display element 20 is a liquid crystal display element employing a transmission-type liquid crystal panel using a thin film transistor (TFT), which is an active-matrix liquid crystal panel formed of a plurality of liquid crystal pixels arranged in two-dimensional directions. Note that, as the image display element 20, an organic EL display or the like other than the liquid crystal display element may also be employed.

The display plate 30 is generally referred to also as a dial plate, which is an exposed component exposed in a space enclosed by a tubular wind plate formed on the visual-recognition side and a transparent plate closing a visual-recognition-side opening portion of the wind plate in the vehicular display device 100. The display plate 30 is formed of a translucent base material made of a synthetic resin such as a polycarbonate resin or an acrylic resin and having a surface with semi-lucent or light-blocking printing partially or entirely performed thereon to have a flat plate shape. Note that, instead of printing, coating may also be performed on the surface of the display plate 30. Alternatively, an optical resin or an optical filter material which transmits near-infrared light may also be held on the display plate such as by being stuck thereto.

Figure 3:
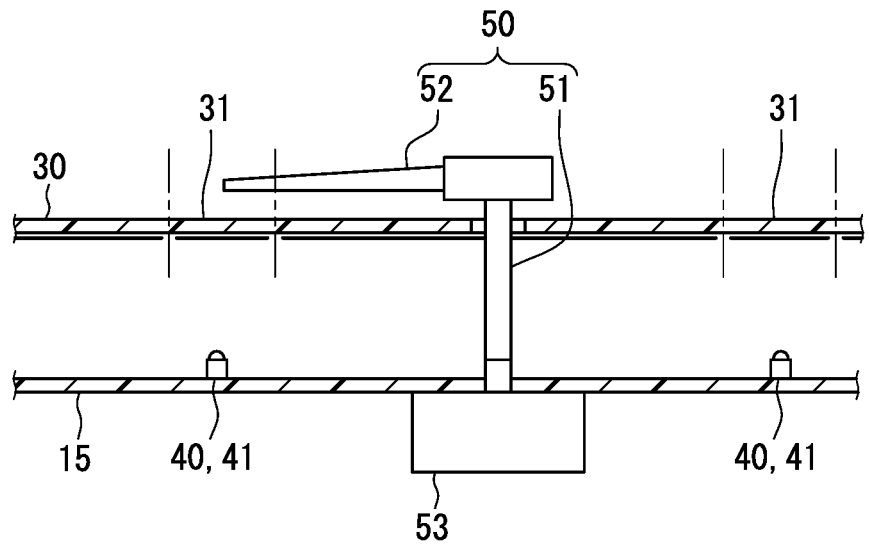
FIG. 3 is a cross-sectional view for illustrating indicators, index marks, and the like in the vehicular display device of the first embodiment.

The display plate 30 is disposed on the visual-recognition side of the image display element 20. Onto a portion of the display plate 30 which overlaps the image display element 20, printing or the like is not performed and, consequently, an image is displayed on the visual-recognition side without interfering with the display plate 30. As shown in FIG. 3, on left and right regions of the display plate 30 with the image display element 20 being interposed therebetween, the respective index marks 31 indicated by the indicators 50 are formed. The index marks 31 of the display plate 30 are illuminated with light from the display light source portions 40 on the counter-visual-recognition side.

The display light source portions 40 are disposed on the counter-visual-recognition side of the display plate 30 and have a plurality of display light emitting elements 41 each of which emits visible display light. For each of the display light emitting elements 41, for example, a light emitting diode element is used. Each of the display light emitting elements 41 is connected to a power source through a conductive pattern on a substrate 15 having a flat-plate shape to emit visible display light toward the display plate 30. Specifically, each of the display light emitting elements 41 emits, as the visible display light, white light made of light widely distributed in a wavelength range of about 400 to 800 nm.

In the display plate 30, a light blocking region and a display region are formed by printing described above or the like. The light blocking region occupies a large area in the display plate 30 and is dark-colored (e.g., blackened) by light-blocking printing or the like to thus block the visible display light from the counter-visual-recognition side. The display region is subjected to or not subjected to semi-lucent printing to thus transmit the visible display light from the counter-visible-recognition side. Since the index marks 31 are set in the display region, the index marks 31 are displayed, while emitting light.

The plurality of indicators 50 are disposed such that, in the center portion 10 of the vehicular display device 100, the image display element 20 is laterally interposed therebetween. Particularly in the present embodiment, the one indicator 50 is provided on each of the left and right sides of the image display element 20. Each of the indicators 50 integrally has a joining portion 51 and an indicating portion 52. The joining portion 51 is disposed on the counter-visual-recognition side of the display plate 30 to be joined to a rotation shaft of a stepping motor 53 held by the substrate 15 having the flat-plate shape. The indicating portion 52 is disposed on the visual-recognition side of the display plate 30 and needle-shaped to be able to indicate the index marks 31.

Each of the indicators 50 is rotative around the rotation shaft in accordance with an output from the stepping motor 53 to indicate the index marks 31 corresponding thereto and thus display information corresponding to an indicating position. Particularly in the present embodiment, the left indicator 50 and the left index marks 31 display the speed of the vehicle 1, while the right indicator 50 and the right index marks 31 display the number of engine revolutions of the vehicle 1.

Thus, through the opening portion 4e of the steering operation portion 4, the image display element 20 disposed in the center portion 10 of the vehicular display device 100 and the indicators 50 display information.

Figure 4:
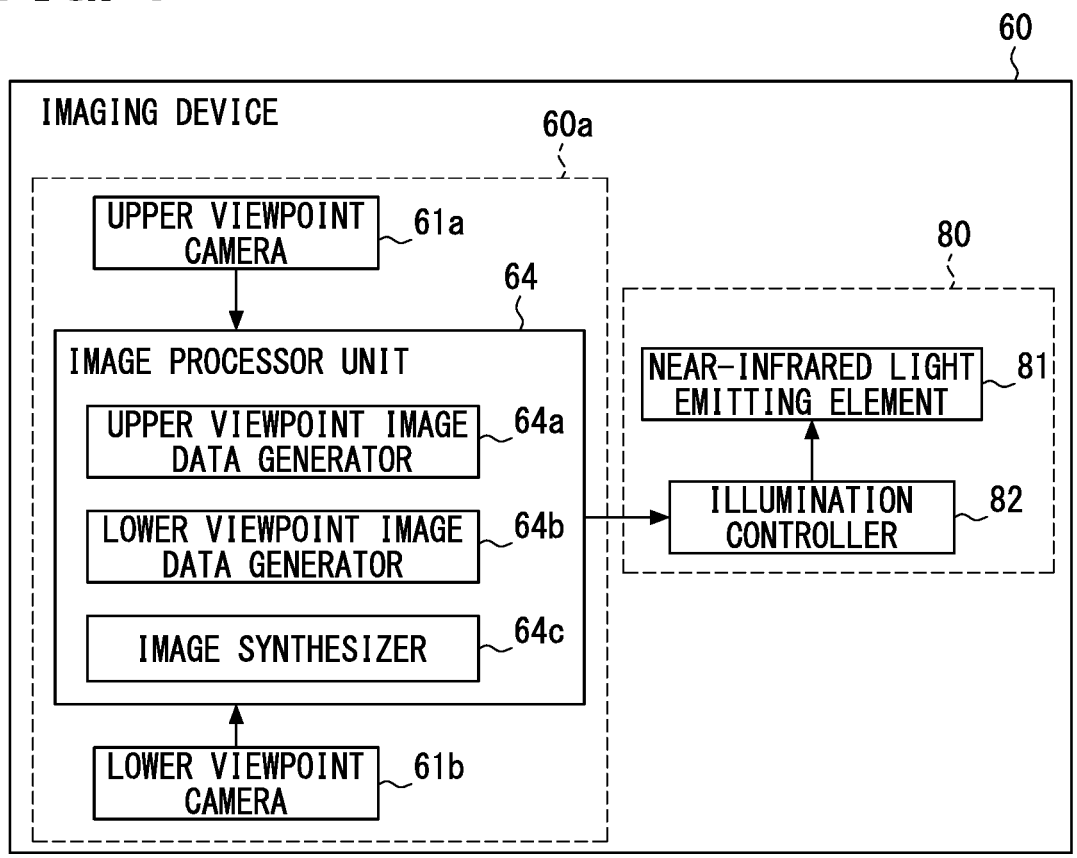
FIG. 4 is a block diagram showing a configuration of the imaging device of the first embodiment.

As shown in FIG. 4, the imaging device 60 includes an imaging unit 60a having a plurality of cameras 61a and 61b and an image processor unit 64, an illumination unit 80, and the like. In the present embodiment, as the plurality of cameras 61a and 61b, the total of two cameras, i.e., an upper viewpoint camera 61a and a lower viewpoint camera 61b are provided to form a pair.

Figure 5:
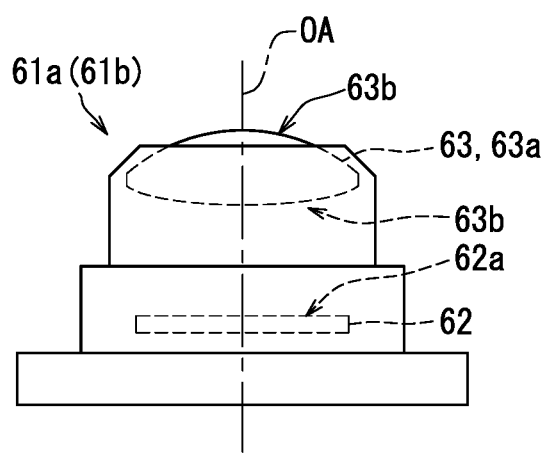
FIG. 5 is a view showing a camera of the imaging device of the first embodiment in enlarged relation.

As specifically shown in FIG. 5, each of the cameras 61a and 61b has an imaging element 62 and a lens portion 63 over the imaging element 62 so as to form an image of the object to be imaged. The imaging element 62 detects light incident on a rectangular imaging surface 62a formed by two-dimensionally arranging pixels made of detection elements such as photodiodes. As the imaging element 62, an element having an excellent sensitivity to light including visible light and near-infrared light and detects an image with a high resolution, such as a CMOS sensor, is used.

The lens portion 63 includes one or a plurality of lenses 63a. In the present embodiment, a virtual axis connecting respective centers of curvature of individual refractive surfaces 63b of the lenses 63a is defined as an optical axis OA. Even when an aspheric lens is included in the lens portion 63, the optical axis OA is defined as a rotation symmetric axis of each of the refractive surfaces 63b. In the present embodiment, the optical axis OA is set perpendicular to the imaging surface 62a so as to pass through a center point of the imaging surface 62a. In each of the cameras 61a and 61b, an orientation of the optical axis OA corresponds to a photographing direction.

Figure 6:
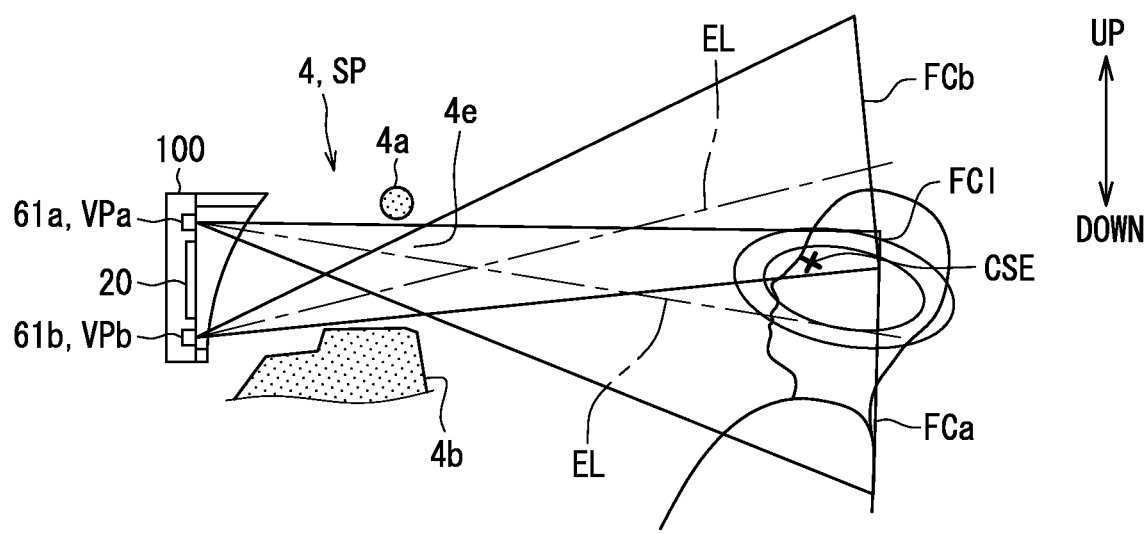
FIG. 6 is a view showing a vertical cross section for illustrating a photographing range of the first embodiment.

As shown in FIGS. 2 and 6, each of the cameras 61a and 61b is disposed on the counter-visual-recognition side of the display plate 30. Respective facing regions of the display plate 30 facing the individual cameras 61a and 61b are set as near-infrared light transmission regions 32. In the near-infrared light transmission regions 32, a transmittance of near-infrared light is set high, while a transmittance of visible light at a wavelength shorter than that of the near-infrared light is set low. As a result, the near-infrared light transmitted by each of the near-infrared light transmission regions 32 to the counter-visual-recognition side is allowed to be detected by the imaging element 62, while the cameras 61a and 61b are not clearly visually recognized by a passenger on the visual-recognition side.

The pair of cameras 61a and 61b are disposed at positions vertically displaced from each other in the center portion 10 of the vehicular display device 100. More specifically, the pair of cameras 61a and 61b are disposed such that the image display element 20 is vertically interposed therebetween, and are aligned to each other in the vertical direction to have the same lateral position.

The upper viewpoint camera 61a is disposed above the lower viewpoint camera 61b. Particularly in the present embodiment, the upper viewpoint camera 61a is disposed in an upper outer peripheral portion 10a forming an outer peripheral portion of the vehicular display device 100 above the image display element 20. The upper viewpoint camera 61a assumes the position of the upper outer peripheral portion 10a as a viewpoint position VPa and photographs the driver from the viewpoint position VPa. The upper viewpoint camera 61a is disposed to be inclined with respect to a direction perpendicular to the display plate 30 and face downward.

The lower viewpoint camera 61b is disposed below the upper viewpoint camera 61a. Particularly in the present embodiment, the lower viewpoint camera 61b is disposed in a lower outer peripheral portion 10b forming an outer peripheral portion of the vehicular display device 100 below the image display element 20. The lower viewpoint camera 61b assumes the position of the lower outer peripheral portion 10b as a viewpoint position VPb and photographs the driver from the viewpoint position VPb. The lower viewpoint camera 61b is disposed to be inclined with respect to a direction perpendicular to the display plate 30 and face upward.

An extension line EL of the optical axis OA of the upper viewpoint camera 61a is set to pass through a region below the center of standard eye points CSE, while extending through the opening portion 4e of the steering operation portion 4 at the normal position. The extension of the extension line EL through the opening portion 4e is achieved irrespective of the movement of the steering operation portion 4 in the predetermined vertical range. Since the upper viewpoint camera 61a is disposed to be inclined as described above, a photographing range FCa covered by the upper viewpoint camera 61a is downwardly offset from the center of standard eye points CSE.

The extension line EL of the optical axis OA of the lower viewpoint camera 61b is set to pass through a region above the center of standard eye points CSE, while extending through the opening portion 4e of the steering operation portion 4 at the normal position. The extension of the extension line EL through the opening portion 4e is achieved irrespective of the movement of the steering operation portion 4 in the predetermined vertical range. Since the lower viewpoint camera 61b is disposed to be inclined as described above, a photographing range FCb covered by the lower viewpoint camera 61b is upwardly offset from the center of standard eye points CSE.

Thus, a photographing direction in which the passenger is photographed from the viewpoint position VPa and a photographing direction in which the passenger is photographed from the viewpoint position VPb are different from each other. Since the respective extension lines EL of the optical axes OA of the individual cameras 61a and 61b are set to cross each other on a vehicular display device 100 side of the center of standard eye points CSE, a vertical relationship between the individual cameras 61a and 61b and a vertical relationship between the individual photographing ranges FCa and FCb are inverse to each other. Since the photographing range FCa covered by the upper viewpoint camera 61a and the photographing range FCb covered by the lower viewpoint camera 61b are offset from the center of standard eye points CSE in opposite directions, the photographing ranges FCa and FCb have respective portions overlapping each other, while being displaced from each other.

Figure 7:
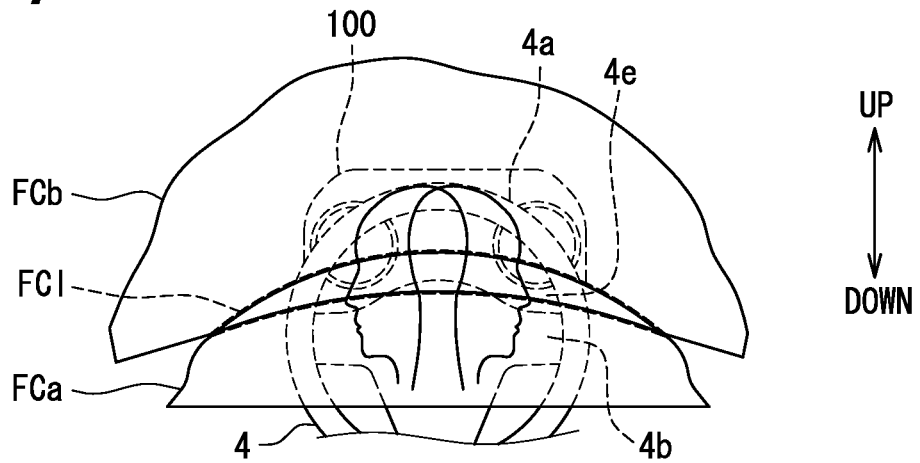
FIG. 7 is a front view for illustrating the photographing range of the first embodiment.

As shown more specifically in FIG. 7, the individual photographing ranges FCa and FCb are interrupted by the rim portion 4a and the connecting portion 4b each disposed around the opening portion 4e, and accordingly have semi-circular (or sectoral) shapes reflecting the shape of the opening portion 4e. Consequently, a range FCl in which a lower end portion of the photographing range FCb covered by the lower viewpoint camera 61b and an upper end portion of the photographing range FCa covered by the upper viewpoint camera 61a overlap each other has a crescent shape due to an outline of the upper end portion having an arcuate shape reflecting a shape of the annular rim portion 4a.

Figure 8:
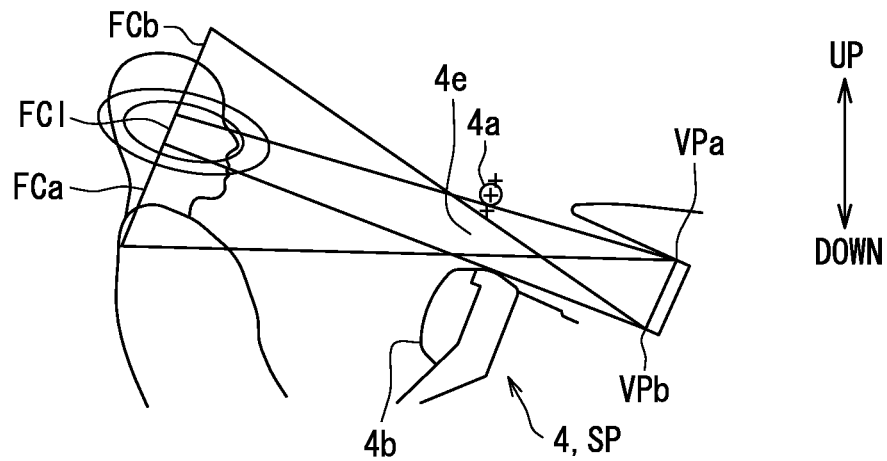
FIG. 8 is a view showing a vertical cross section for illustrating influence of position adjustment of a steering operation portion in the first embodiment, which shows a case where the steering operation portion is at a standard position.

The overlap between the photographing ranges FCa and FCb is achieved irrespective of the movement of the steering operation portion 4 in the predetermined vertical range. When the steering operation portion 4 in FIG. 8 is adjusted to the standard position SP, an upper side of the photographing range FCa covered by the upper viewpoint camera 61a is interrupted by the rim portion 4a, while a lower side thereof is scarcely interrupted. A lower side of the photographing range FCb covered by the lower viewpoint camera 61b is interrupted by the connecting portion 4b, while an upper side thereof is scarcely interrupted. As a result, the overlapping range FCl is formed in the vicinity of the center of standard eye points CSE.

Figure 9:
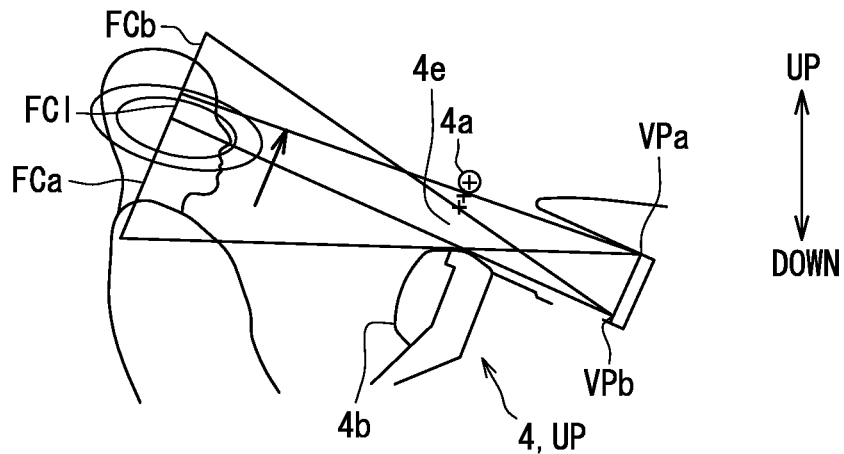
FIG. 9 is a view showing a vertical cross section for illustrating the influence of the position adjustment of the steering operation portion in the first embodiment, which shows a case where the steering operation portion is at an upper limit position.

When the steering operation portion 4 in FIG. 9 is adjusted to an upper limit position UP (e.g., 15 mm above the standard position SP), due to a rise of the connecting portion 4b, a lower interrupted range of the photographing range FCb covered by the lower viewpoint camera 61b is increased in size compared to that when the steering operation portion 4 is at the standard position. However, due to a simultaneous rise of the rim portion 4a, an upper interrupted range of the photographing range FCa covered by the upper viewpoint camera 61a is reduced in size. As a result, even when the steering operation portion 4 is moved upward, the overall photographing range is scarcely changed. The overlapping range FCl only moves upward, and no blank zone is formed.

Figure 10:
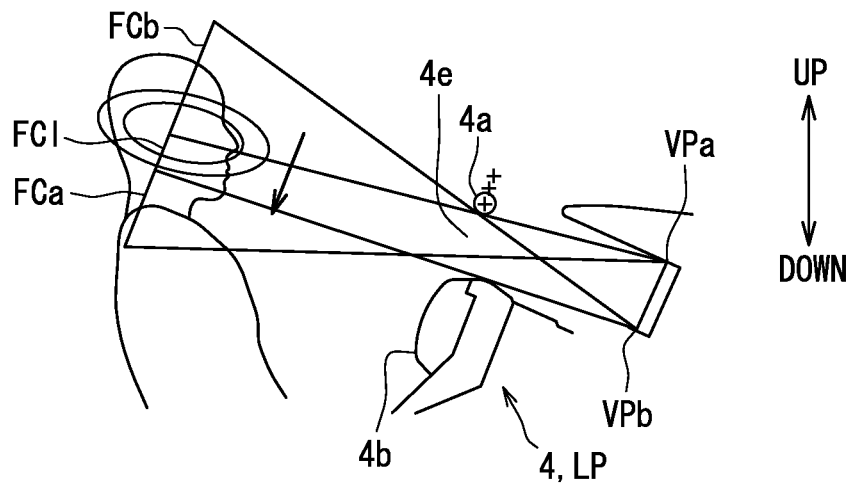
FIG. 10 is a view showing a vertical cross section for illustrating the influence of the position adjustment of the steering operation portion in the first embodiment, which shows a case where the steering operation portion is at a lower limit position.

When the steering operation portion 4 in FIG. 10 is adjusted to a lower limit position LP (e.g., 15 mm below the standard position), due to a fall of the rim portion 4a, the upper interrupted range of the photographing range FCa covered by the upper viewpoint camera 61a is increased in size compared to that when the steering operation portion 4 is at the standard position SP. However, due to a simultaneous fall of the connecting portion 4b, the lower interrupted range of the photographing range FCb covered by the lower viewpoint camera 61b is reduced in size. As a result, even when the steering operation portion 4 is moved downward, the overall photographing range is scarcely changed. The overlapping range FCl only moves downward, and no blank zone is formed.

Thus, the upper viewpoint camera 61a and the lower viewpoint camera 61b allow the photographing ranges FCa and FCb to complement each other with respect to the movement of the steering operation portion 4.

The image processor unit 64 is implemented as a functional block built to include, as a main component, an electronic circuit in which at least one processor, a memory, an input/output interface, and the like are mounted on the substrate 15. The processor executes a computer program stored in the memory based on a signal input to the processor from the imaging element 62 of each of the cameras 61a and 61b through the input/output interface to be able to perform image processing. The electronic circuit may also be provided separately for the image processor unit 64 or may also be shared by a control circuit for controlling the image display element 20, the indicators 50, and the like.

More specifically, as shown in FIG. 4, the image processor unit 64 has an upper-viewpoint image data generator 64a, a lower-viewpoint image data generator 64b, and an image synthesizer 64c. The upper-viewpoint image data generator 64a generates, from the signal input thereto from the imaging element 62 of the upper viewpoint camera 61a, image data IMa for the upper viewpoint camera 61a resulting from photographing of a portion of the face of the driver as the object to be photographed (see also FIG. 11). The lower-viewpoint image data generator 64b generates, from the signal input thereto from the imaging element 62 of the lower viewpoint camera 61b, image data IMb for the lower viewpoint camera 61b resulting from photographing of a portion of the face of the driver as the object to be photographed (see also FIG. 12).

Figure 13:
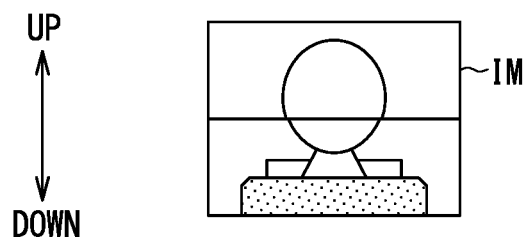
FIG. 13 is a view for illustrating post-synthesis image data in the first embodiment.

The image synthesizer 64c synthesizes the image data IMa for the upper viewpoint camera 61a and the image data IMb for the lower viewpoint camera 61b (see also FIG. 13). Image data IM resulting from the synthesis represents a record of a photographing range wider than that when the object to be photographed is photographed from the single viewpoint at the one viewpoint position. In the present embodiment, as described above, the respective lateral positions of the upper viewpoint camera 61a and the lower viewpoint camera 61b are aligned with each other, and consequently photographing angles in the overlapping range FCl have substantially no lateral difference therebetween. As a result, in the synthesis for the image data IM, an overlapping process for the overlapping range FCl can be simplified, and an amount of calculation during the synthesis is reduced. Accordingly, a reduction in memory usage, an improvement in processing speed, and the like can be expected.

The image data IM resulting from the synthesis may be output directly to the outside of the vehicular display device 100, such as an ECU (Electric Control Unit) of the vehicle 1, and analyzed by the ECU or, alternatively, the image processor unit 64 may also analyze the image data IM to determine whether or not a driver is sleeping or distracted while driving.

Figure 11:
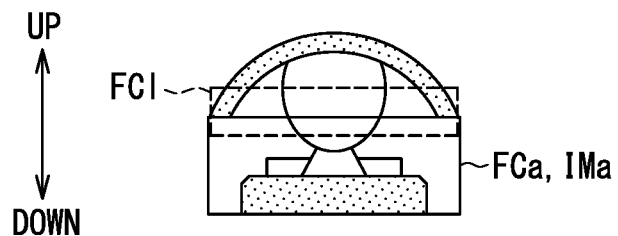
FIG. 11 is a view for illustrating a correspondence relationship between a photographing range covered by an upper viewpoint camera and image data in the first embodiment.
Figure 12:
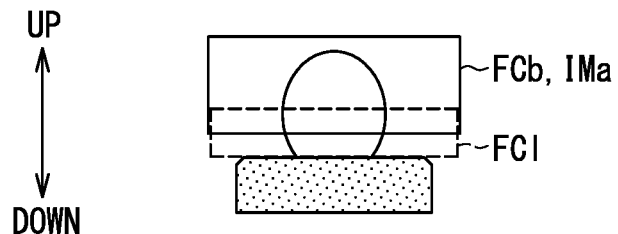
FIG. 12 is a view for illustrating a correspondence relationship between a photographing range covered by a lower viewpoint camera and image data in the first embodiment.

Note that ranges hatched with dots in FIGS. 11 to 13 show the photographing ranges interrupted by the steering operation portion 4.

Thus, the imaging device 60 includes the cameras 61a and 61b individually disposed at the respective viewpoint positions VPa and VPb to photograph the passenger from the multiple viewpoints at the plurality of viewpoint positions VPa and VPb vertically displaced from each other in the vehicular display device 100.

The illumination unit 80 shown in FIGS. 2 and 4 illuminates the passenger to be photographed by the cameras 61a and 61b with illuminating light. The illumination unit 80 is disposed in, e.g., the vicinity of the image display element 20 in the vehicular display device 100.

The illumination unit 80 has a near-infrared light emitting element 81 and an illumination controller 82. For the near-infrared light emitting element 81, e.g., a light emitting diode is used. The near-infrared light emitting element 81 is disposed on the counter-visual-recognition side of the display plate 30. More specifically, the near-infrared light emitting element 81 is held on a visual-recognition-side surface of the substrate 15 and connected to the power source through the conductive pattern on the substrate 15 to emit near-infrared light. Particularly in the present embodiment, the near-infrared light emitting element 81 having wavelength properties including, e.g., a peak wavelength of 850 nm and a half-value width of about 30 to 40 nm is used.

The illumination controller 82 is implemented as a functional block built to include, as a main component, an electronic circuit in which at least one processor, a memory, an input/output interface, and the like are mounted on the substrate 15. The electronic circuit may also be provided separately for the illumination unit 80 or may also be used commonly as an electronic circuit implementing the image processor unit 64. Alternatively, the electronic circuit may also be shared by the control circuit for controlling the image display element 20, the indicators 50, and the like.

In response to turning ON and OFF of an ignition switch of the vehicle 1 or the like, the illumination controller 82 controls the turning ON and OFF of the near-infrared light emitting element 81. When the near-infrared light emitting element 81 is ON, the illumination controller 82 controls an amount of emitted light based on a brightness, a contrast, or the like in the image data IM generated by the image processor unit 64.

Functions and Effects

The functions and effects of the first embodiment described above will be described again below.

According to the first embodiment, the passenger is photographed by the imaging device 60 from multiple viewpoints at the plurality of viewpoint positions VPa and VPb. Since the plurality of viewpoint positions VPa and VPb are vertically displaced from each other, it is possible to vertically further extend the overall imaging range compared to that when the passenger is photographed from a single viewpoint. As a result, even when a position of a region (e.g., face) of the passenger to be photographed is vertically displaced from a standard position due to individually different body frames or individually different driving postures, it is possible to image the region.

Even when an obstacle which interrupts photographing, such as the steering operation portion 4, is disposed between the vehicular display device 100 and the passenger, and the region is hidden by the obstacle from one of the viewpoint positions VPa or VPb, it is possible to photograph the region from the other viewpoint position VPb or VPa vertically displaced from the one viewpoint position VPa or VPb. Thus, it is possible to achieve high robustness in imaging.

Figure 14:
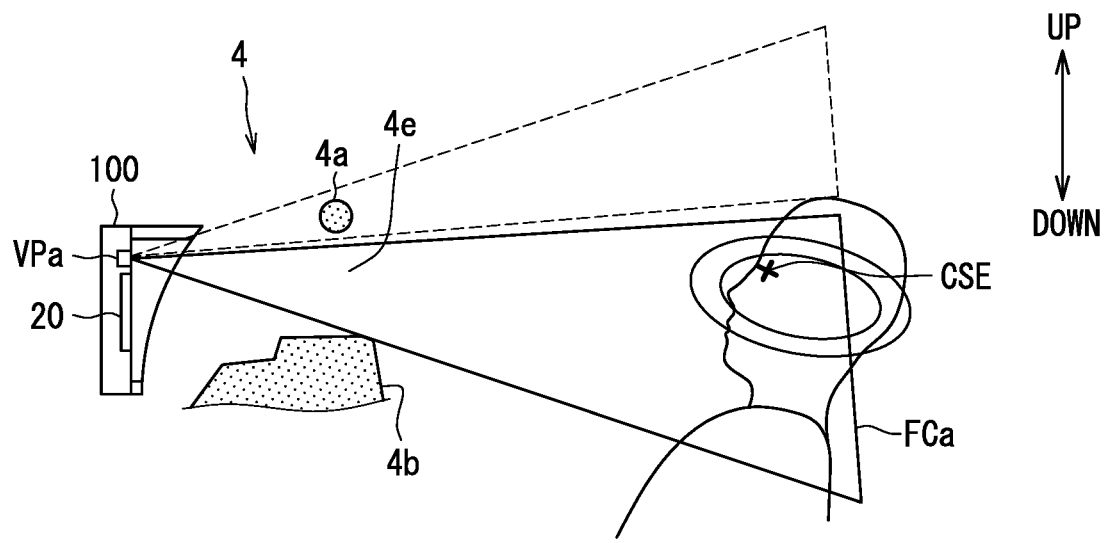
FIG. 14 is a view showing a vertical cross section for illustrating a photographing range covered by an imaging device in a first comparative example.

A detailed description will be given herein using first and second comparative examples. In the first comparative example shown in FIG. 14, the passenger is photographed from a single viewpoint at the viewpoint position VPa above the image display element 20. In this example, the wide photographing range FCa is ensured below the center of standard eye points CSE. However, since the upper side of the photographing range FCa is interrupted by the rim portion 4a of the steering operation portion 4, the passenger cannot be photographed.

Figure 15:
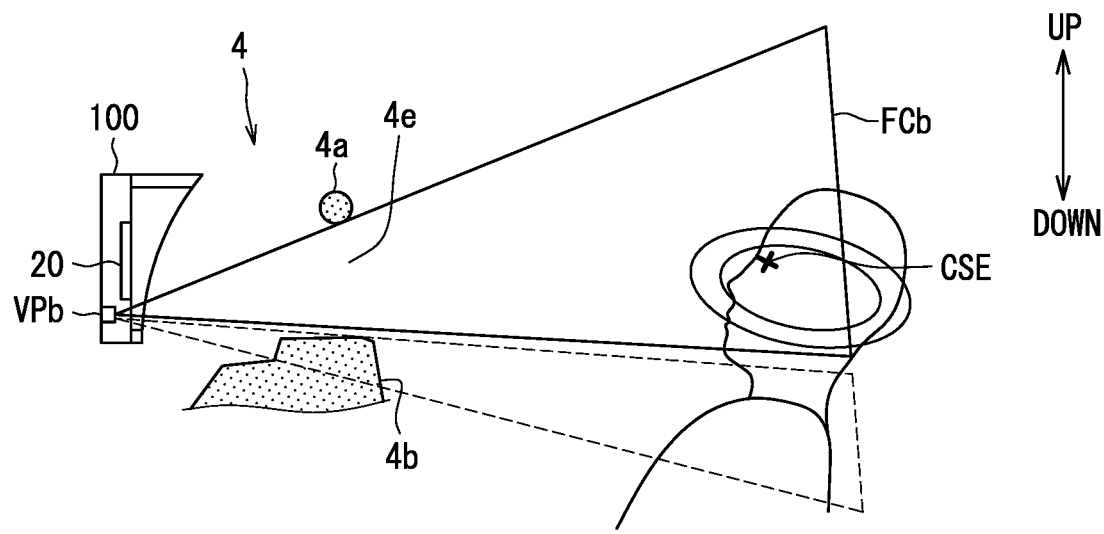
FIG. 15 is a view showing a vertical cross section for illustrating a photographing range covered by an imaging device in a second comparative example.

In the second comparative example shown in FIG. 15, the passenger is photographed from a single viewpoint at the viewpoint position VPb below the image display element 20. In this example, the wide photographing range FCb is ensured above the center of standard eye points CSE. However, since the lower side of the photographing range FCb is interrupted by the connecting portion 4b of the steering operation portion 4, the passenger cannot be photographed.

In contrast to photographing from the single viewpoint as performed in the first and second comparative examples, photographing from the multiple viewpoints as performed in the present embodiment can cover a blind spot formed in the case of single-viewpoint photographing, as shown in FIG. 6. Accordingly, it is possible to enhance robustness.

According to the first embodiment, the photographing range FCa in which the passenger is photographed from the viewpoint position VPa as one of the plurality of viewpoints VPa and VPb and the photographing range FCb in which the passenger is photographed from the viewpoint position VPb as the other one of the plurality of viewpoints VPa and VPb have respective portions overlapping each other. This can not only restrict a blank zone in which the passenger cannot be photographed from being formed between the individual photographing ranges FCa and FCb, but also allow relative positions of the individual regions of the passenger photographed in the respective photographing ranges FCa and FCb to be easily and precisely detected when the passenger is photographed extensively in the plurality of photographing ranges FCa and FCb. As a result, it is possible to precisely image the passenger.

According to the first embodiment, the plurality of viewpoint positions VPa and VPb are set in the center portion 10 of the vehicular display device 100. Accordingly, even when the steering operation portion 4 is disposed on the visual-recognition side of the vehicular display device 100, it is possible to photograph the passenger from the plurality of viewpoint positions VPa and VPb in front of the passenger through the opening portion 4e provided in the steering operation portion 4, while achieving a relatively wide photographing range.

According to the first embodiment, the imaging device 60 includes the cameras 61a and 61b individually placed at the respective viewpoint positions VPa and VPb to photograph the passenger from the multiple viewpoints. By merely placing the cameras 61a and 61b directly at the respective viewpoint positions VPa and VPb, the passenger can be photographed from the multiple viewpoints. Consequently, it is possible to easily implement high robustness in imaging.

According to the first embodiment, the two viewpoint positions VPa and VPb are disposed with the respective lateral positions thereof being aligned with each other. This can reduce a lateral difference between the respective photographing angles in images resulting from imaging from the individual viewpoint positions VPa and VPb. As a result, a process when, e.g., the individual images resulting from photographing are synthesized is facilitated, and the relative positions of the individual regions of the passenger photographed in the respective photographing ranges FCa and FCb can be easily and precisely detected. Consequently, it is possible to precisely image the passenger.

According to the first embodiment, the photographing direction in which the passenger is photographed from the viewpoint position VPa as one of the plurality of viewing positions VPa and VPb and the photographing direction in which the passenger is photographed from the viewing point VPb as the other one of the plurality of viewpoint positions VPa and VPb are vertically different from each other. Consequently, even when it is difficult to ensure a large distance between the plurality of viewpoint positions VPa and VPb due to restrictions on the vertical size of the vehicular display device 100, a positional relationship with the opening portion 4e of the steering operation unit 4, and the like, the photographing range can be vertically extended to be equal to or larger than the distance.

According to the first embodiment, the imaging device 60 further includes the illumination unit 80 that illuminates the passenger. The illumination unit 80 allows the passenger as the object to be photographed to be brightly illuminated and photographed. Consequently, it is possible to easily achieve high robustness in imaging.

Figure 16:
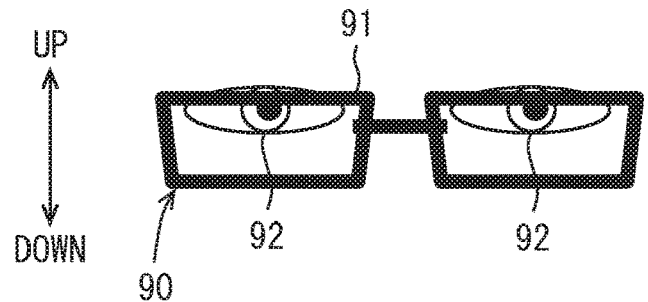
FIG. 16 is a view showing an example of photographing of a passenger from an upper viewpoint camera in the first embodiment.
Figure 17:
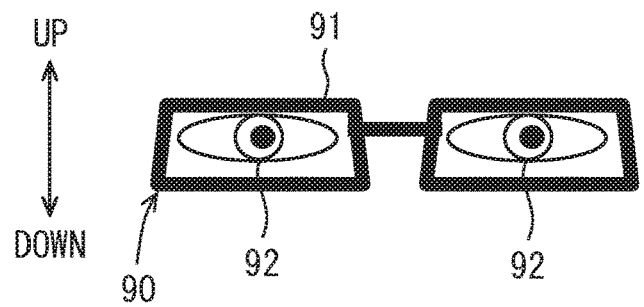
FIG. 17 is a view showing an example of photographing of the passenger from a lower viewpoint camera in the first embodiment.

The first embodiment also achieves an effect specific to photographing of a passenger wearing eyeglasses 90 from a plurality of viewpoints. For example, when the passenger is photographed from the one viewpoint position VPa, it may be possible that a frame 91 of the eyeglasses 90 is photographed to overlap eyelids or pupils 92 of the passenger, and consequently the eyelids or the pupils are hidden (see FIG. 16). In such a case also, in photographing from the other viewpoint position VPb, it may be possible to restrict the frame 91 of the eyeglasses 90 from being photographed to overlap the eyelids or the pupils 92 (see FIG. 17). Accordingly, high robustness is achieved in imaging.

Figure 18:
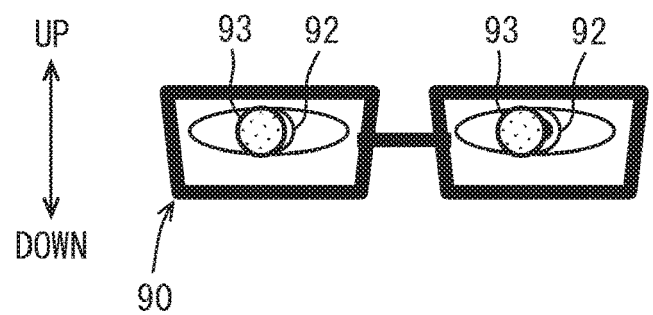
FIG. 18 is a view showing an example of photographing of the passenger from the upper viewpoint camera in the first embodiment.
Figure 19:
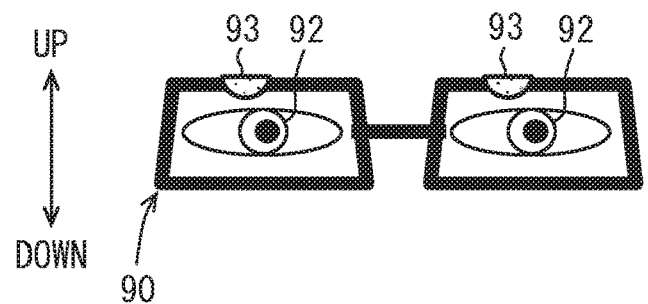
FIG. 19 is a view showing an example of photographing of the passenger from the lower viewpoint camera in the first embodiment.

For example, when the passenger is photographed from the one viewpoint position VPa, it may be possible that light from the outside or light from the vehicular display device 100 is reflected by the lenses and, due to the reflected light, ball-like glare spots 93 are formed to cover the pupils 92 of the passenger (see FIG. 18). In such a case also, in the photographing from the other viewpoint position VPb, due to the difference between the photographing angles, the pupils 92 are photographed with the ball-like glare spots 93 resulting from the reflected light being shifted therefrom (see FIG. 19). Accordingly, high robustness is achieved in imaging.

Second Embodiment

Figure 20:
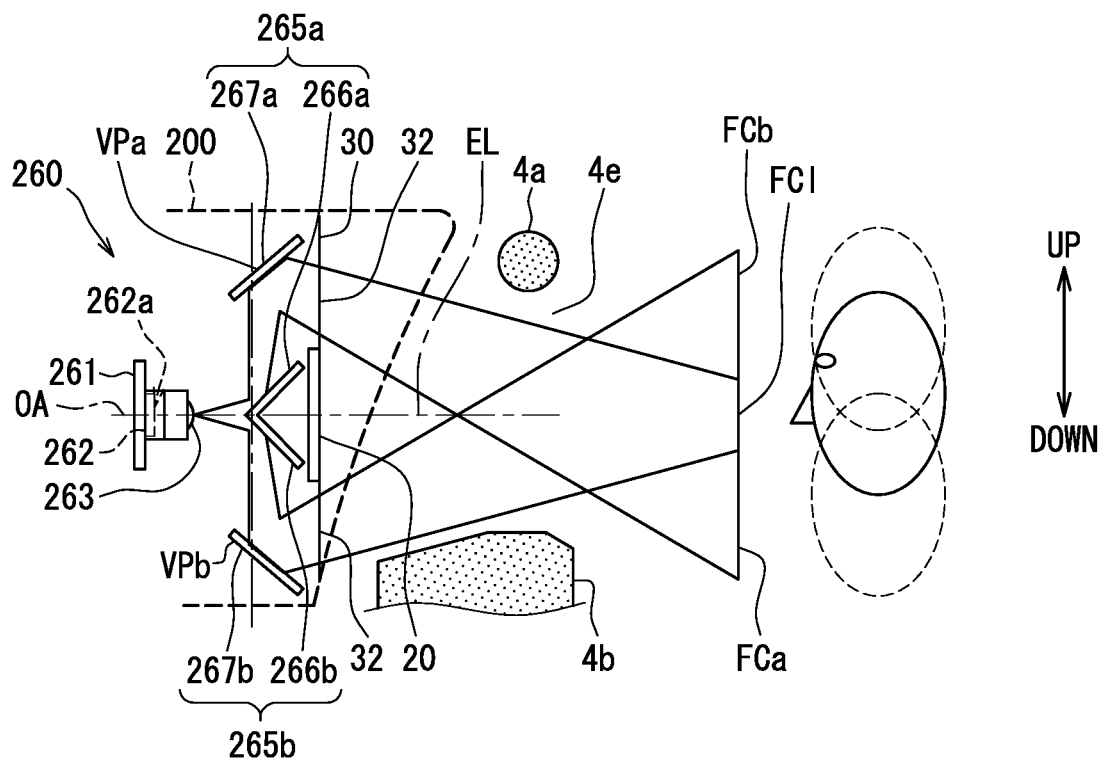
FIG. 20 is a view showing a vertical cross section showing a vehicular display device and an imaging device of a second embodiment.

As shown in FIG. 20, a second embodiment is a modification of the first embodiment. A description will be given of the second embodiment with emphasis on points different from those in the first embodiment.

An imaging device 260 of the second embodiment is provided in a vehicular display device 200 and includes an imaging unit 60a, an illumination unit 80, and the like. The imaging unit 60a includes the image processor unit 64, a common camera 261, a plurality of discrete light guiding optical systems 265a and 265b, and the like. In the present embodiment, as the plurality of discrete light guiding optical systems 265a and 265b, the total of two discrete light guiding optical systems, i.e., the upper-viewpoint light guiding optical system 265a and the lower-viewpoint light guiding optical system 265b are provided to form a pair.

The common camera 261 is configured to have the similar inner structure as that of each of the cameras 61a and 61b of the first embodiment. However, the common camera 261 is not placed at each of the viewpoint positions VPa and VPb, but is placed in an inner space formed on the counter-visual-recognition side of each of the display plate 30 and the image display element 20 with a lens portion 263 facing the visual-recognition side. Thus, an imaging element 262 of the common camera 261 is provided commonly to the individual viewpoint positions VPa and VPb to detect light incident on an imaging surface 262a thereof.

The pair of discrete light guiding optical systems 265a and 265b are provided to correspond to the individual viewpoint positions VPa and VPb. The upper-viewpoint light guiding optical system 265a is disposed above the extension line EL of the optical axis OA of the common camera 261. Specifically, the upper-viewpoint light guiding optical system 265a has a divided mirror 266a and a viewpoint position mirror 267a.

The divided mirror 266a is disposed above the extension line EL of the optical axis OA of the common camera 261 between the common camera 261 and the image display element 20. The divided mirror 266a has a lower end portion located so as to come into contact with the extension line EL of the optical axis OA. The divided mirror 266a has a planar reflecting surface having a square profile and provided inclined to be upwardly further away from the common camera such that the reflecting surface faces each of a portion (e.g., upper half) of the lens portion 263 and the viewpoint position mirror 267a.

The viewpoint position mirror 267a is disposed on the counter-visual-recognition side of the display plate 30 and above the divided mirror 266a and the image display element 20. The viewpoint position mirror 267a has a planar reflecting surface having a rectangular profile and provided inclined to be upwardly closer to the display plate 30 such that the reflecting surface faces each of the divided mirror 266a and the display plate 30.

A facing region of the display plate 30 facing the viewpoint position mirror 267a is set as the near-infrared light transmission region 32 similar to that provided in the first embodiment. Accordingly, light transmitted by the near-infrared light transmission region 32 and incident on the viewpoint position mirror 267a is reflected toward the divided mirror 266a and further reflected by the divided mirror 266a toward the lens portion 263 of the common camera 261. Then, the reflected light is focused by the lens portion 263 onto a partial region (e.g., region corresponding to a lower half of the imaging surface) of the imaging surface. Specifically, a position at which the viewpoint position mirror 267a is disposed forms the one viewpoint position VPa, and the upper-viewpoint light guiding optical system 265a individually corresponding to the viewpoint position VPa guides light incident on the viewpoint position VPa to the imaging element 262 to allow the partial region of the imaging surface 262a individually corresponding to the viewpoint position VPa to detect the light.

The lower-viewpoint light guiding optical system 265b is disposed below the extension line EL of the optical axis OA of the common camera 261. Specifically, the lower-viewpoint light guiding optical system 265b has a divided mirror 266b and a viewpoint position mirror 267b.

The divided mirror 266b is disposed below the extension line EL of the optical axis OA of the common camera 261 between the common camera 261 and the image display element 20. The divided mirror 266b has an upper end portion located so as to come into contact with the extension line EL of the optical axis OA. In other words, the divided mirrors 266a and 266b are disposed such that the lower end portion of the divided mirror 266a and the upper end portion of the divided mirror 266b come into contact with each other. The divided mirror 266b has a planar reflecting surface having a rectangular profile and provided inclined to be downwardly further away from the common camera 261 such that the reflecting surface faces each of a portion (e.g., lower half) of the lens portion 263 and the viewpoint position mirror 267b.

The viewpoint position mirror 267b is disposed on the counter-visual-recognition side of the display plate 30 and below the divided mirror 266a and the image display element 20. The viewpoint position mirror 267b has a planar reflecting surface having a rectangular profile and provided inclined to be downwardly closer to the display plate 30 such that the reflecting surface faces the divided mirror 266a and the display plate 30.

A facing region of the display plate 30 facing the viewpoint position mirror 267b is also set as the near-infrared light transmission region 32. Accordingly, light transmitted by the near-infrared light transmission region 32 and incident on the viewpoint position mirror 267b is reflected toward the divided mirror 266b and further reflected by the divided mirror 266b toward the lens portion 263 of the common camera 261. Then, the reflected light is focused by the lens portion 263 onto a partial region (e.g., region corresponding to an upper half of the imaging surface) of the imaging surface 262a. Specifically, a position at which the viewpoint position mirror 267b is disposed forms the one viewpoint position VPb, and the lower-viewpoint light guiding optical system 265b individually corresponding to the viewpoint position VPb guides light incident on the viewpoint position VPb to the imaging element 262 to allow the partial region of the imaging surface 262a individually corresponding to the viewpoint position VPb to detect the light.

Thus, the upper-viewpoint light guiding optical system 265a and the lower-viewpoint light guiding optical system 265b are configured to be substantially vertically symmetrical to each other with respect to the extension line EL of the optical axis OA of the common camera 261 serving as a line of symmetry. In addition, the photographing range FCa covered by the upper-viewpoint light guiding optical system 265a and the photographing range FCb covered by the lower-viewpoint light guiding optical system 265b have respective portions overlapping each other, while being displaced from each other. Thus, the imaging device 260 includes the discrete light guiding optical systems 265*a* and 265*b* individually corresponding to the respective viewpoint positions VPa and VPb to photograph the passenger from multiple viewpoints at the plurality of viewpoint positions VPa and VPb vertically displaced from each other.

According to the second embodiment described heretofore, the discrete light guiding optical systems 265*a* and 265*b* guide light beams incident on the corresponding viewpoint positions VPa and VPb to the imaging element 262 of the common camera 261 to cause the partial regions of the imaging surface 262*b* individually corresponding to the viewpoint positions VPa and VPb to detect the light beams. This not only allows the number of cameras to be placed to be reduced, but also allows images from the individual viewpoint positions VPa and VPb to be detected by the common imaging surface 62*a*. Consequently, it is easy to synchronize photographing performed at the individual viewpoint positions VPa and VPb. Therefore, it is possible to allow the passenger to be precisely imaged and achieve high robustness in imaging.

Other Embodiments

While the description has thus been given of the plurality of embodiments, the disclosure should not be construed to be limited to the foregoing embodiments. The disclosure is applicable to various embodiments and a combination thereof within the scope not departing from the gist of the disclosure.

Specifically, in a first modification, three or more viewpoint positions may also be provided.

Figure 21:
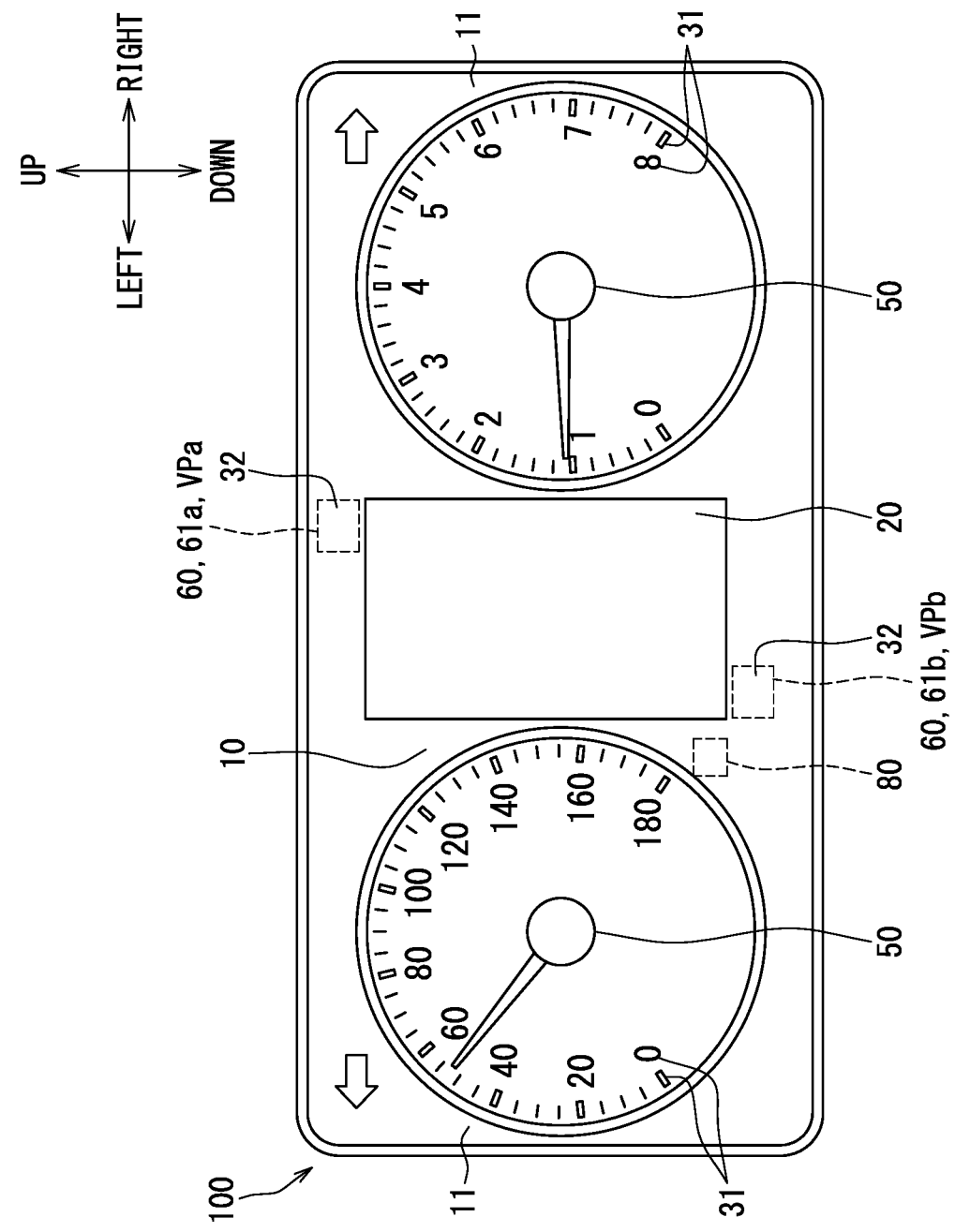
FIG. 21 is a front view of a vehicular display device in a first modification.

In a second modification, when two viewpoint positions are provided, the two viewpoint positions VPa and VPb may also be laterally displaced from each other. For example, as shown in FIG. 21, the two viewpoint positions VPa and VPb may also be set along a diagonal line of the rectangular image display element 20.

In a third modification, the photographing directions at the individual viewpoint positions VPa and VPb may also coincide with each other. In this case also, the photographing ranges are displaced from each other depending on a distance between the individual viewpoint positions VPa and VPb, and consequently the overall photographing range can be extended.

In a fourth modification, the photographing range FCa in which the passenger is photographed from the one viewpoint position VPa and the photographing range FCb in which the passenger is photographed from the other viewpoint position VPb need not necessarily have respective portions overlapping each other.

In a fifth modification, at least one of the plurality of viewpoint positions VPa and VPb may be disposed in either of the lateral portions 11 of the vehicular display device 100.

In a sixth modification, the illumination unit 80 may also be provided as a device separate from the imaging device 60 outside the vehicular display device 100. Alternatively, the illumination unit 80 need not necessarily be provided.

In a seventh modification, the vehicular display device 100 need not necessarily display information through the opening portion 4*e* provided in the steering operation portion 4 in the center portion 10 thereof. In addition, the steering operation portion 4 of the vehicle 1 need not necessarily be disposed on the visual-recognition side of the vehicular display device 100.

Figure 22:
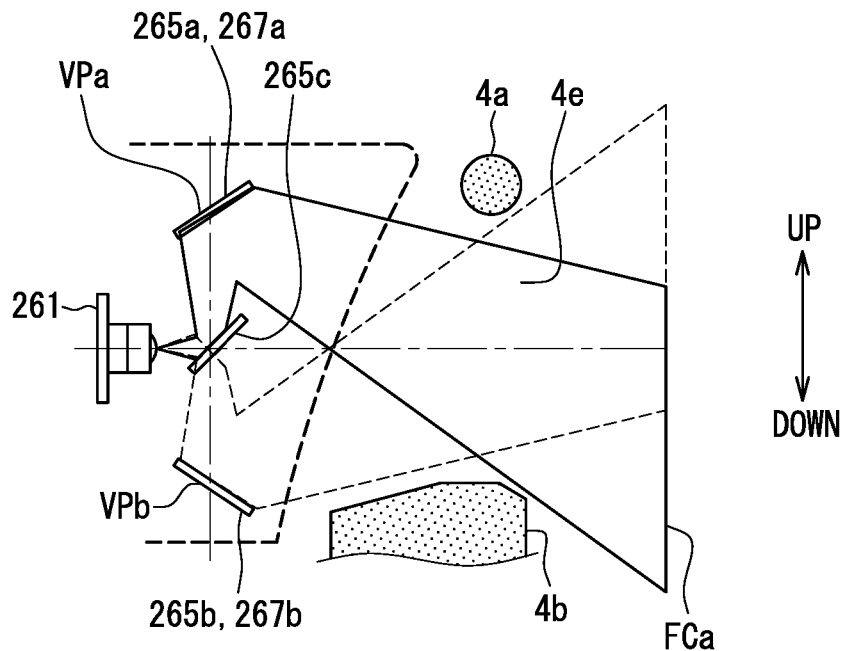
FIG. 22 is a view showing a vertical cross section of a vehicular display device and an imaging device in an eighth modification, which is a view showing a case where a viewpoint is changed to an upper viewpoint.
Figure 23:
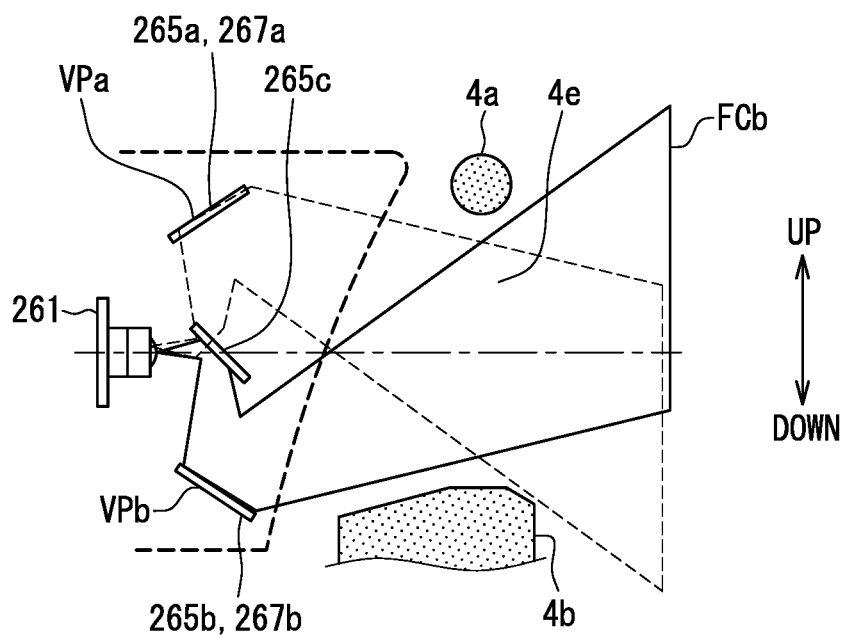
FIG. 23 is a view showing a vertical cross section showing the vehicular display device and the imaging device in the eighth modification, which is a view showing a case where the viewpoint is changed to a lower viewpoint.

In an eighth modification related to the second embodiment, as shown in FIGS. 22 and 23, it may also be possible to provide a common mirror 265*c* to be shared between the discrete light guiding optical systems 265*a* and 265*b* instead of the divided mirrors 266*a* and 266*b* of the discrete light guiding optical systems 265*a* and 265*b*, and change an orientation of a reflecting surface of the common mirror 265*c* by rotating the common mirror 265*c*.

By doing so, when the reflecting surface of the common mirror 265*c* faces the lens portion 263 and the viewpoint position mirror 267*a* of the upper-viewpoint light guiding optical system 265*a* (see FIG. 22), light incident on the viewpoint position mirror 267*a* is focused onto the imaging surface 262*a*. When the reflecting surface of the common mirror 265*c* faces the lens portion 263 and the viewpoint position mirror 267*b* of the lower-viewpoint light guiding optical system 265*b* (see FIG. 23), light incident on the viewpoint position mirror 267*b* is focused onto the imaging surface 262*a*. Thus, it is possible to switch between the viewpoint positions VPa and VPb. In addition, it is also possible to allow the image processor unit 64 to synthesize image data before the switching and image data after the switching.

What is claimed is:

1. An imaging device provided in a vehicular display device that is mounted in a vehicle on a counter-visual recognition side of a steering operation portion of the vehicle to display information, and the imaging device configured to photograph a driver of the vehicle, the imaging device comprising:

an imaging unit having at least two viewpoint positions disposed in the vehicular display device as a first viewpoint position and a second viewpoint position, the imaging unit configured to photograph the driver through an opening portion of the steering operation portion from each of the first viewpoint position and the second viewpoint position; and an image processing unit configured to process photographs of the driver from each of the first viewpoint position and the second viewpoint position, wherein the first viewpoint position is vertically offset from the second viewpoint position in the vehicular display device, wherein a photographing range from the first viewpoint position is defined as a first photographing range, and a photographing range from the second viewpoint position is defined as a second photographing range, wherein an orientation direction of the first viewpoint position for photographing the first photographing range is inverse to an orientation direction of the second viewpoint position for photographing the second photographing range, wherein, in the first photographing range, the imaging unit is further configured to photograph, as a first photograph of the driver, a lower portion of a face of the driver without including an entirety of an upper portion of the face of the driver, wherein, in the second photographing range, the imaging unit is further configured to photograph, as a second photograph of the driver, the upper portion of the face of the driver without including an entirety of the lower portion of the face of the driver, wherein the image processing unit is further configured to synthesize an image of the driver by combining the first photograph of the driver with the second photograph of the driver, wherein the first viewpoint position has an optical axis that passes through a region below a center of standard eye points for the driver, and the first photographing range being downwardly offset from the center of standard eye points for the driver, and wherein the second viewpoint position has an optical axis that passes through a region above the center of standard eye points for the driver, and the second photographing range being upwardly offset from the center of standard eye points for the driver.

2. The imaging device according to claim 1, wherein a portion of the first photographing range and a portion of the second photographing range overlap each other.

3. The imaging device according to claim 2, wherein an upper end portion of the first photographing range and a lower end portion of the second photographing range overlap each other.

4. The imaging device according to claim 1, wherein, the information is displayed in a center portion of the vehicular display device and is visible through the opening portion of the steering operation portion, and wherein the first viewpoint position and the second viewpoint position are disposed in the center portion of the vehicle display device.

5. The imaging device according to claim 1, wherein the imaging unit further includes a plurality of cameras including a first camera disposed at the first viewpoint position and configured to capture the first photograph of the driver, and a second camera disposed at the second viewpoint position and configured to capture the second photograph of the driver.

6. The imaging device according to claim 1, wherein the imaging unit further includes:

an imaging element provided commonly to the first viewpoint position and the second viewpoint position and having an imaging surface, the imaging element configured to detect light incident on the imaging surface; and a plurality of discrete light guiding optical systems including a first light guiding optical system for the first viewpoint position and a second light guiding optical system for the second viewpoint position, wherein the first light guiding optical system is configured to guide light from the first viewpoint position toward the imaging element to cause a first partial region of the imaging surface that corresponds to the first viewpoint position to detect the light, and wherein the second light guiding optical system is configured to guide light from the second viewpoint position toward the imaging element to cause a second partial region of the imaging surface that corresponds to the second viewpoint position to detect the light.

7. The imaging device according to claim 1, wherein the first viewpoint position and the second viewpoint position are aligned with each other in a vertical direction without being offset in a lateral direction.

8. The imaging device according to claim 7, further comprising:

an illumination unit configured to illuminate the driver.

9. A vehicular display device mounted in a vehicle on a counter-visual recognition side of a steering operation portion of the vehicle to display information, the vehicular display device comprising:

an imaging device configured to photograph a driver of the vehicle, the imaging device including an imaging unit having at least two viewpoint positions disposed within the vehicular display device as a first viewpoint position and a second viewpoint position, the imaging unit configured to photograph a driver of the vehicle through an opening portion of the steering operation portion from each of the first viewpoint position and the second viewpoint position; and an image processing unit configured to process photographs of the driver from each of the first viewpoint position and the second viewpoint position, wherein the first viewpoint position is vertically offset from the second viewpoint position in the vehicle display device, wherein a photographing range from the first viewpoint position is defined as a first photographing range, and a photographing range from the second viewpoint position is defined as a second photographing range, wherein an orientation direction of the first viewpoint position for photographing the first photographing range is inverse to an orientation direction of the second viewpoint position for photographing the second photographing range, wherein, in the first photographing range, the imaging unit is further configured to photograph, as a first photograph of the driver, a lower portion of a face of the driver without including an entirety of an upper portion of the face of the driver, wherein, in the second photographing range, the imaging unit is further configured to photograph, as a second photograph of the driver, the upper portion of the face of the driver without including an entirety of the lower portion of the face of the driver, wherein the image processing unit is further configured to synthesize an image of the driver by combining the first photograph of the driver with the second photograph of the driver, wherein the first viewpoint position has an optical axis that passes through a region below a center of standard eye points for the driver, and the first photographing range being downwardly offset from the center of standard eye points for the driver, and wherein the second viewpoint position has an optical axis that passes through a region above the center of standard eye points for the driver, and the second photographing range being upwardly offset from the center of standard eye points for the driver.

* * * * *